US009690590B2

(12) United States Patent
Carlson

(10) Patent No.: US 9,690,590 B2
(45) Date of Patent: Jun. 27, 2017

(54) FLEXIBLE INSTRUCTION EXECUTION IN A PROCESSOR PIPELINE

(71) Applicant: Cavium, Inc., San Jose, CA (US)

(72) Inventor: David Albert Carlson, Haslet, TX (US)

(73) Assignee: CAVIUM, INC., San Jose, CA (US)

(*) Notice: Subject to any disclaimer, the term of this patent is extended or adjusted under 35 U.S.C. 154(b) by 267 days.

(21) Appl. No.: 14/514,708

(22) Filed: Oct. 15, 2014

(65) Prior Publication Data

US 2016/0110201 A1  Apr. 21, 2016

(51) Int. Cl.
*G06F 9/30* (2006.01)
*G06F 9/40* (2006.01)
*G06F 9/38* (2006.01)

(52) U.S. Cl.
CPC .......... *G06F 9/3836* (2013.01); *G06F 9/3867* (2013.01)

(58) Field of Classification Search
None
See application file for complete search history.

(56) References Cited

U.S. PATENT DOCUMENTS

| 5,905,881 | A  | * | 5/1999  | Tran ...................... G06F 9/3861 708/233 |
| 6,173,388 | B1 | * | 1/2001  | Abercrombie ...... G06F 9/30145 345/563 |
| 7,447,879 | B2 |   | 11/2008 | Luick |
| 7,769,987 | B2 |   | 8/2010  | Luick |
| 8,694,994 | B1 | * | 4/2014  | Vincent ................. G06F 9/5094 718/1 |
| 8,756,404 | B2 |   | 6/2014  | Luick |
| 2006/0179284 | A1 | * | 8/2006  | Jensen ................ G06F 9/30079 712/219 |
| 2008/0133888 | A1 | * | 6/2008  | Arakawa ............. G06F 9/30105 712/214 |
| 2009/0006820 | A1 | * | 1/2009  | Abernathy .......... G06F 9/30181 712/219 |
| 2011/0264862 | A1 | * | 10/2011 | Karlsson ............... G06F 9/3802 711/125 |
| 2015/0277926 | A1 | * | 10/2015 | Rijshouwer .......... G06F 9/3861 712/240 |

OTHER PUBLICATIONS

Chen, et al., "A 2X Load/Store Pipe for a Low-Power 1-GHz Embedded Processor" IEEE Journal of Solid-State Circuits, vol. 38 (No. 11), Nov. 2003, pp. 1857-1865.
Chen, et al., "A 2X Load/Store Pipe for a Low-Power 1GHz Embedded Processor", ISSCC 2003, Session 19, Processor Building Blocks, Paper 19.4.

* cited by examiner

*Primary Examiner* — Michael Sun
(74) *Attorney, Agent, or Firm* — Occhiuti & Rohlicek LLP

(57) ABSTRACT

Executing instructions in a processor includes: selecting or more instructions to be issued together in the same clock cycle of the processor from among a plurality of instructions, the selected one or more instructions occurring consecutively according to a program order; and executing instructions that have been issued, through multiple execution stages of a pipeline of the processor. The executing includes: determining a delay assigned to a first instruction, and sending a result of a first operation performed by the first instruction in a first execution stage to a second execution stage, where the number of execution stages between the first execution stage and the second execution stage is based on the determined delay.

18 Claims, 2 Drawing Sheets

FLEXIBLE INSTRUCTION EXECUTION IN A PROCESSOR PIPELINE

BACKGROUND

The invention relates to flexible instruction execution in a processor pipeline.

A processor pipeline includes multiple stages through which instructions advance, a cycle at a time. An instruction is fetched (e.g., in an instruction fetch (IF) stage or stages). An instruction is decoded (e.g., in an instruction decode (ID) stage or stages) to determine an operation and one or more operands. Alternatively, in some pipelines, the instruction fetch and instruction decode stages could overlap. An instruction has its operands fetched (e.g., in an operand fetch (OF) stage or stages). An instruction issues, which typically starts progression of the instruction through one or more stages of execution. Execution may involve applying the instruction's operation to its operand(s) for an arithmetic logic unit (ALU) instruction, or may involve storing or loading to or from a memory address for a memory instruction. Finally, an instruction is committed, which may involve storing a result (e.g., in a write back (WB) stage or stages).

In a scalar processor, instructions proceed one-by-one through the pipeline, typically in-order according to a program (i.e., in program order), with at most a single instruction being committed per cycle. In a superscalar processor, multiple instructions may proceed through the same pipeline stage at the same time, allowing more than one instruction to issue per cycle, depending on certain conditions (called 'hazards'), up to an 'issue width'. Some superscalar processors issue instructions in-order, with consecutive instructions proceeding through the pipeline in program order. Some superscalar processors allow instructions to be reordered and issued out-of-order, which potentially increases overall pipeline throughput. If reordering is allowed, instructions can be reordered within a sliding 'instruction window' (whose size can be larger than the issue width), and at the end of the pipeline, a reorder buffer can be used to temporarily store results (and other information) associated with instructions in the instruction window to enable the instructions to be committed in-order (potentially allowing multiple instructions to be committed in the same cycle as long as they are contiguous in the program order).

SUMMARY

In one aspect, in general, a method for executing instructions in a processor includes: selecting or more instructions to be issued together in the same clock cycle of the processor from among a plurality of instructions, the selected one or more instructions occurring consecutively according to a program order; and executing instructions that have been issued, through multiple execution stages of a pipeline of the processor. The executing includes: determining a delay assigned to a first instruction, and sending a result of a first operation performed by the first instruction in a first execution stage to a second execution stage, where the number of execution stages between the first execution stage and the second execution stage is based on the determined delay.

In another aspect, in general, a processor includes: circuitry configured to select or more instructions to be issued together in the same clock cycle of the processor from among a plurality of instructions, the selected one or more instructions occurring consecutively according to a program order; and circuitry configured to execute instructions that have been issued, through multiple execution stages of a pipeline of the processor. The executing includes: determining a delay assigned to a first instruction, and sending a result of a first operation performed by the first instruction in a first execution stage to a second execution stage, where the number of execution stages between the first execution stage and the second execution stage is based on the determined delay.

Aspects can include one or more of the following features.

The first stage includes a functional unit configured to perform the first operation, and the second execution stage does not include any functional unit configured to perform the first operation.

The second stage occurs later in the pipeline than the first stage.

Sending the result of the first operation to the second stage includes sending an output of the functional unit to an input of a multiplexer in the second stage.

There are multiple paths through the execution stages.

The first instruction is executed along a first path, the result of the first operation depends on a result of a second operation performed by a second instruction, and the second instruction is executed along a second path different from the first path.

In at least one stage of the pipeline, operations to be performed by instructions are analyzed, where the analyzing includes: determining a latency associated with a first operation to be performed by a first instruction, determining a second operation to be performed by a second instruction, where a result of the second operation depends on a result of the first operation, and assigning a delay to the second instruction corresponding to the determined latency associated with the first operation.

Any instruction selected to be issued in a clock cycle after a clock cycle in which a previous instruction issued occurs later in the program order than the previous instruction.

The number of execution stages between the first execution stage and the second execution stage is based on the determined delay.

The number of execution stages between the first execution stage and the second execution stage is equal to the determined delay.

Aspects can have one or more of the following advantages.

In-order processors are typically less complex, and therefore more power-efficient, compared to out-of-order processors that aggressively take advantage of instruction reordering to improve performance. However, some improvement in performance can be achieved without substantially sacrificing power efficiency by configuring the pipeline to dynamically delay execution of certain issued instructions. Instructions are still issued in-order, but dynamic flexibility is provided within the execution stages to handle latency between dependent instructions.

Some instructions perform an operation whose result depends on a result of an operation performed by a previous instruction (according to program order). One way to handle such dependence between a 'dependent instruction' and a 'latent instruction' is to prevent the dependent instruction from issuing until after the latent instruction has provided its result (which may occur before the latent instruction has completely progressed to the end of the pipeline). However, this may cause other instructions to be held back when they could have proceeded to issue, as described in more detail below.

Another way to handle such dependence is to provide separate pipelines with a fixed delay relative to each other, and issue the dependent instruction to one pipeline and the latent instruction to the other pipeline. However, such a mechanism is inflexible and may introduce longer delays than needed in certain cases.

With the dynamic delay assignment and dynamic functional unit placement provided by the techniques described herein, the latency associated with various instructions can be managed in a way that enables improvement of overall instruction throughput, as described in more detail below.

Other features and advantages of the invention will become apparent from the following description, and from the claims.

DESCRIPTION

Figure 1:
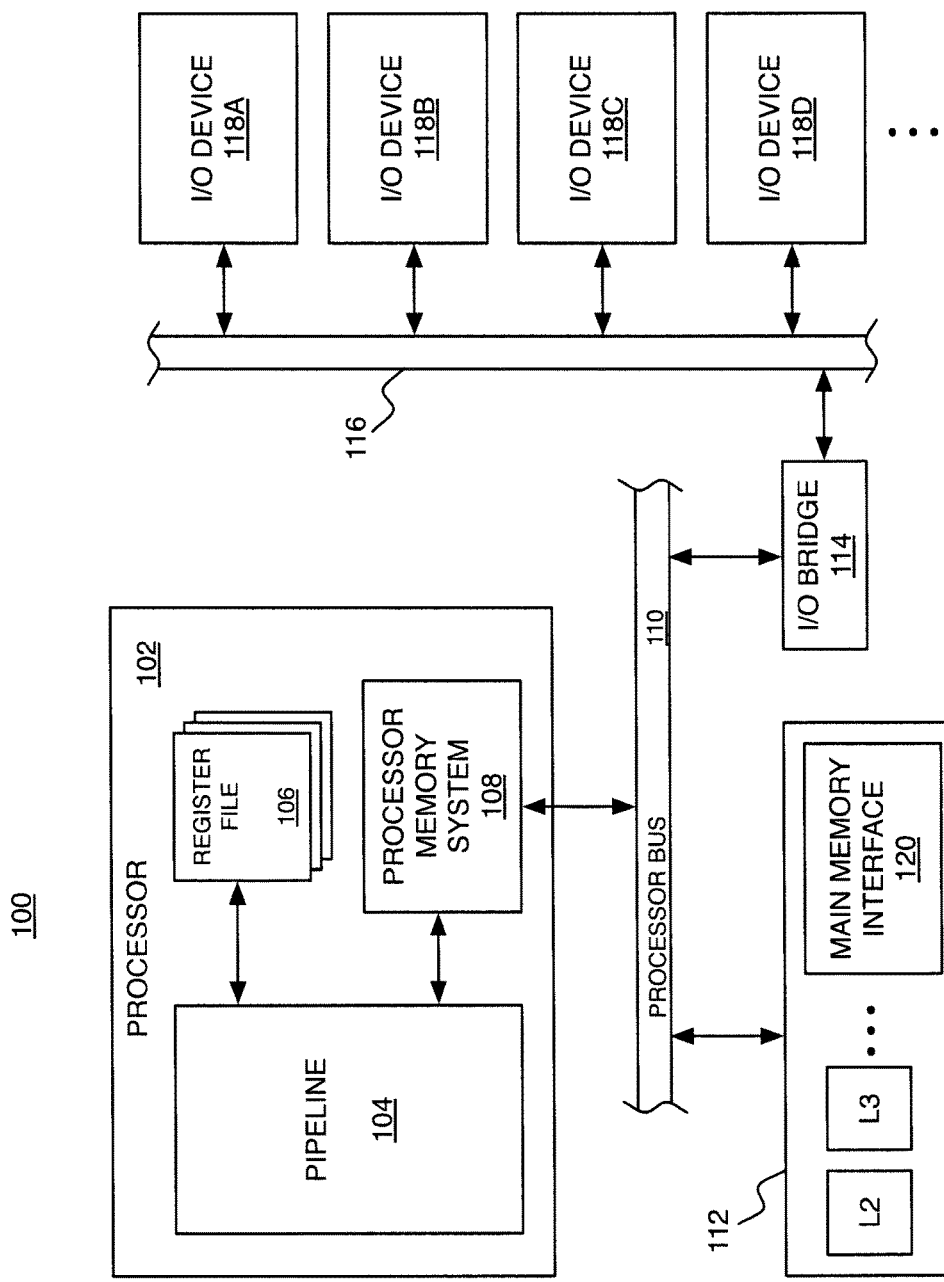
FIG. 1 is a schematic diagram of a computing system.

FIG. 1 shows an example of a computing system 100 in which the processors described herein could be used. The system 100 includes at least one processor 102, which could be a single central processing unit (CPU) or an arrangement of multiple processor cores of a multi-core architecture. In this example, the processor 102 includes a pipeline 104, one or more register files 106, and a processor memory system 108. The processor 102 is connected to a processor bus 110, which enables communication with an external memory system 112 and an input/output (I/O) bridge 114. The I/O bridge 114 enables communication over an I/O bus 116, with various different I/O devices 118A-118D (e.g., disk controller, network interface, display adapter, and/or user input devices such as a keyboard or mouse).

The processor memory system 108 and external memory system 112 together form a hierarchical memory system that includes a multi-level cache, including at least a first level (L1) cache within the processor memory system 108, and any number of higher level (L2, L3, . . . ) caches within the external memory system 112. The processor memory system 108 includes a translation lookaside buffer (TLB), an L1 cache, and various other circuitry for handling a miss in either the TLB or the L1 cache. When a load or store instruction is executed, the TLB is used to translate an address of that instruction from a virtual address to a physical address, and to determine whether a copy of that address is in the L1 cache. If so, that instruction can be executed from the L1 cache. If not, that instruction can be handled by miss circuitry so that it may be executed from the external memory system 112, with values that are to be transmitted for storage into the external memory system being temporarily held in a store buffer. Of course, this is only an example. The exact division between which level caches are within the processor memory system 108 and which are in the external memory system 112 can be different in other examples. For example, the L1 cache and the L2 cache could both be internal and the L3 (and higher) cache could be external. The external memory system 112 also includes a main memory interface 120, which is connected to any number of memory modules (not shown) serving as main memory (e.g., Dynamic Random Access Memory modules).

Figure 2:
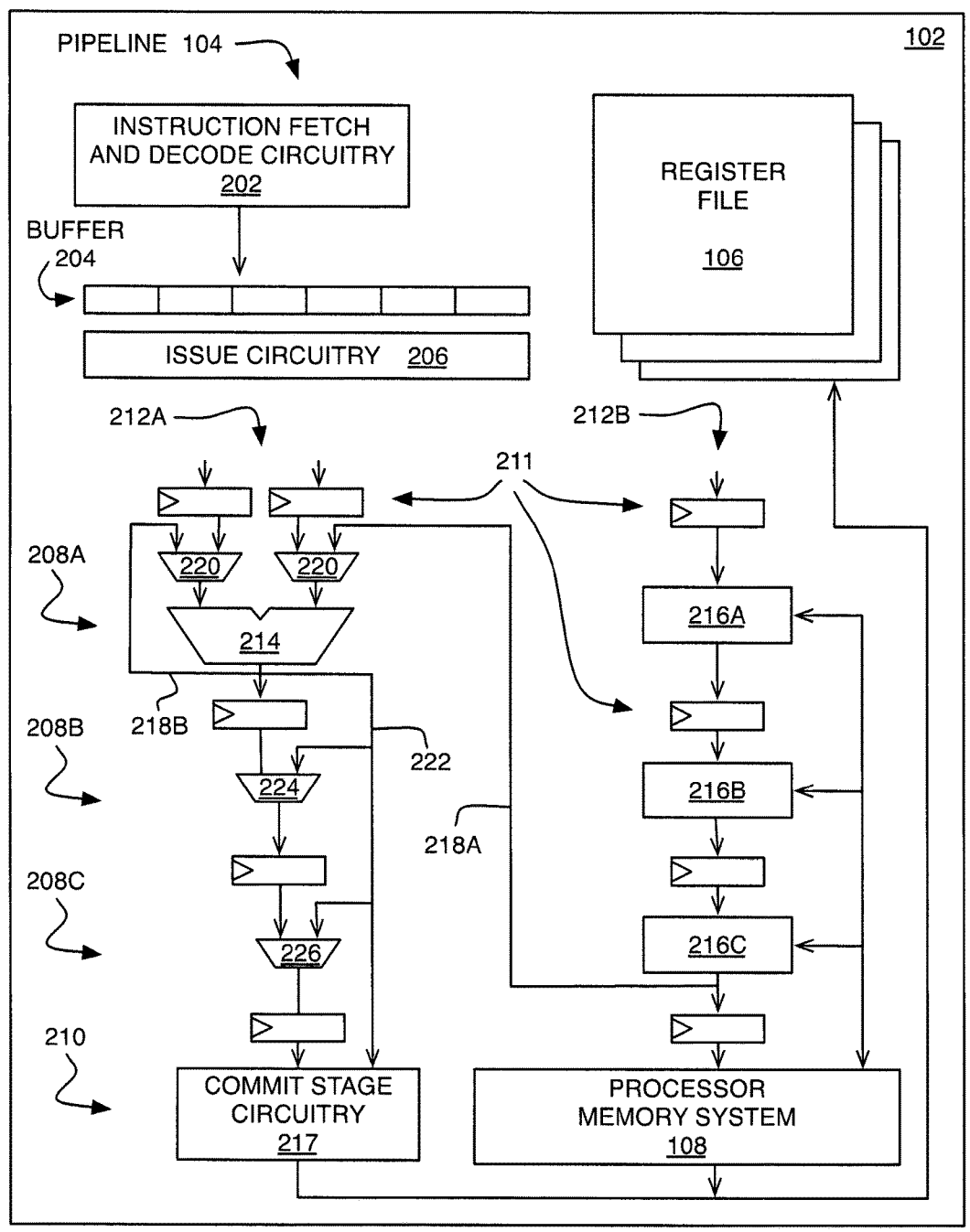
FIG. 2 is a schematic diagram of a processor.

FIG. 2 shows an example in which the processor 102 is a superscalar processor configured to enable flexible instruction execution, while maintaining in-order issuing of instructions. The processor 102 includes circuitry for the various stages of the pipeline 104. For one or more instruction fetch and decode stages, instruction fetch and decode circuitry 202 stores information in a buffer 204 for instructions in the instruction window that have not yet issued. Issue circuitry 206 determines in which cycle instructions in the buffer 204 are to be issued, which makes them available to progress through circuitry of the execution stages 208A, 208B, and 208C of the pipeline 104. (This example has three execution stages, but other examples may have more or fewer execution stages.) There is also at least one commit stage 210 that commits results of instructions that have made their way through the execution stages 208A, 208B, and 208C.

The instruction window includes instructions that have not yet issued (in the buffer 204), and instructions that have been issued but are still "in flight" and have not yet been committed. As instructions are issued, more instructions enter the instruction window by being stored in the buffer 204. Instructions leave the instruction window after they have been committed, but not necessarily in one-to-one correspondence with instructions that enter the instruction window. Therefore the size of the instruction window may vary. Instructions enter the instruction window in-order, are issued in-order, and leave the instruction window in-order. This avoids the need for certain complex circuitry that would otherwise be needed in an out-of-order processor. But, the pipeline 104 includes circuitry that allows a limited form of out-of-order execution, as will be described in more detail below.

Between adjacent stages of the pipeline 104, the various paths through the pipeline circuitry include pipeline registers 211 (shown in FIG. 2 for the execution stages), which store results of an upstream stage waiting to be passed downstream to the next stage. The pipeline registers 211 may be clocked by (i.e., receive a clock signal derived from) a common clock (not shown). Thus, each clock cycle, each pipeline register 211 (also called a latch, or a set of flip-flops) passes a result from its input to its output and becomes ready to receive a new result in its input after that result has been produced by the circuitry of that stage.

There may be multiple separate paths through the execution stages 208A, 208B, and 208C, which include various circuitry for executing instructions. In FIG. 2, two paths are shown, but the execution stages may include any number of paths with corresponding circuitry separated by pipeline registers 211. The number of paths through the execution stages is generally dependent on the specific architecture, but may include enough paths such that a number of instructions up to the issue width can progress through the same execution stages in the same cycles. A first path 212A includes a functional unit 214 (e.g., ALU, multiplier, floating point unit) located in the first execution stage 208A. A second path 212B includes memory instruction circuitry 216A, 216B, and 216C located in the first execution stage 208A, the second execution stage 208B, and the third execution stage, respectively, which perform various functions for executing memory instructions.

Each path through the pipeline is arranged to go through the same number of stages, and therefore each path has the same number of pipeline registers 211. But, different types of instructions, progressing through different paths, may not need the same number of stages for execution. In this example, a memory instruction, such as a load instruction, may need all three stages for translating an address and retrieving a cached value from the processor memory system 108 (progressing through stages 208A, 208B, and 208C). But, an ALU instruction may need only a single stage for an ALU operation to be performed by the functional unit 214 in the first execution stage 208A. Nevertheless, because each path needs to traverse the same number of pipeline registers 211, the first path 212A also includes pipeline registers for stages 208B and 208C, which pass the computed result along without performing further computation (also called "silo stages"). Thus, a memory instruction and an ALU instruction that are consecutive in the program order may issue in the same cycle and progress through the same execution stages in the same cycles, reaching the commit stage 210 together to be committed in the same cycle. For example, commit stage circuitry 217 may write back an ALU instruction result into the register file 106, and the processor memory system 108 may write back a retrieved memory value into the register file 106.

As mentioned above, some instructions perform an operation whose result depends on a result of an operation performed by a previous instruction (according to program order). This type of dependence may arise, for example, for a load instruction that has a latency of n>1 clock cycles between the time it issues and the time a loaded value is available to be used by another instruction. This type of latency is called a load-to-use latency. In another example of this type of dependency, an integer multiplication instruction has a latency of n>1 clock cycles between the time it issues and the time a result is available to be used by another instruction.

Some in-order processors prevent the dependent instruction from issuing until after the latent instruction on which it depends has provided its result. The following is an example with instructions that have been generated from the source code of a program (e.g., by a compiler) to be issued in a particular order (i.e., program order).

1: LOAD R1←[R2]
4: CBZ R1, LOOPEXIT
4: LOAD R1←[R3]
7: CBZ R1, LOOPEXIT

The number preceding each instruction indicates the clock cycle in which that instruction would issue. The instruction issued in cycle 1 is a load instruction that retrieves a value from memory at an address indicated by the contents of register R2 and writes that value into register R1. In the case of a hit in the L1 cache, this load operation performed by the load instruction would take 3 cycles (i.e., a load-to-use latency of 3). In the case of a cache miss, the operation would take longer, but for this analysis, the latency for a cache hit is assumed. This cycle-1 load instruction is executed along the second path 212B. In the illustrated example, the 3 cycles of latency correspond to operations performed by the circuitry 216A, 216B, and 216C in pipeline stages 208A, 208B, and 208C, respectively.

The complete load operation would actually take at least one additional cycle to write the retrieved value into the register R1 (in stage 210), but the pipeline includes a bypass path 218A (also known as a 'forwarding path') to send the value to the input of the functional unit 214 via a multiplexer 220. Both input ports to the functional unit 214 include a multiplexer 220 to select between a value provided by a respective pipeline register 211 and a value provided by a respective bypass path 218A (for one input port) or 218B (for the other input port). In the case of a cache miss, the operation would take even longer, but for this analysis, the latency for a cache hit is assumed.

The next instruction in the program order is a branch instruction that performs an operation known as "compare and branch if zero" (CBZ). In this example, the content of the register R1 would be compared to zero, and if it is equal to zero the instruction would branch to a destination labeled as LOOPEXIT. If it is not equal to zero the instruction would not branch. This type of instruction may be generated, for example, from a loop condition of a loop within the source code (e.g., a while-loop or a for-loop). Since the result of this branch instruction depends on the value that will be loaded into the register R1 (provided via a bypass path), the branch instruction is issued 3 clock cycles after the previous load instruction (i.e., in cycle 4).

The next instruction is another load instruction. Because this load instruction occurs after a branch instruction, whether or not this load instruction is allowed to complete depends on the result of that branch instruction. But, since the result of this load instruction (i.e., the value retrieved) does not depend on the result of the previous instruction, it may be issued in cycle 4 concurrently with the branch instruction. The cycle-4 branch instruction is executed along the first path 212A (with the functional unit 214 performing the CBZ operation), and the cycle-4 load instruction is executed along the second path 212B.

Then, another branch instruction that depends on the previous load instruction is issued in cycle 7 (3 cycles after cycle 4) to account for the load-to-use latency of 3 clock cycles. This cycle-7 branch instruction is executed along the first path 212A.

The processor 102 includes additional circuitry for enabling a flexible execution mode that allows some instructions to issue earlier than in the previous example. The issue circuitry 206 is configured to select a set of one or more instruction (consecutive in program order) to be issued in any given clock cycle. With flexible execution mode enabled, the issue circuitry 206 is configured to use a different criterion for determining which instructions to select in the set to be issued in the same clock cycle. As part of the analysis performed in flexible execution mode, the issue circuitry 206 is configured to assign a delay value to each instruction. If the instruction is not a dependent instruction, then the delay value is zero. If the instruction is a dependent instruction, then a nonzero delay value is assigned to that dependent instruction. The delay value corresponds to a latency associated with a latent instruction on which that dependent instruction depends.

The effect of these assigned delay values is not necessarily to change how long it takes to execute an instruction, but rather to consolidate instruction execution by issuing certain instructions earlier than they would have been able to issue without flexible execution mode enabled. The following is an example of the same instructions in the previous example being issued with flexible execution mode enabled.

1: DELAY(0); LOAD R1←[R2]
1: DELAY(3); CBZ R1, LOOPEXIT
2: DELAY(0); LOAD R1←[R3]
2: DELAY(3); CBZ R1, LOOPEXIT

The DELAY(n) tag associated with each instruction indicates the number n of clock cycles by which a start of execution is to be delayed after the clock cycle in which the instruction is issued. The first load instruction issues in cycle 1 as before. However, the first branch instruction is now able to issue in cycle 1 as well, with an assigned delay value of 3 clock cycles. This means that the branch operation won't be performed in the functional unit 214 until cycle 4, by which time the memory value resulting from the first load instruction will be ready to be supplied via the bypass path 218A. So, the first branch instruction does not finish execution any sooner than in the previous example. But, the second load instruction is able to be issued in cycle 2 instead of in cycle 4. As with the first branch instruction, the second branch instruction can then issue in the same clock cycle as the preceding load instruction (cycle 2) with an assigned delay value of 3 clock cycles.

By allowing instructions to issue early, even though the number of active (i.e., non-delayed) execution cycles needed for any given instruction is the same, later unrelated instructions are potentially able to issue earlier. Also, by delaying the start of active execution of certain instructions, later unrelated instructions are potentially able to execute out-of-order. In this example, the cycle-2 load instruction starts active execution before the cycle-1 branch instruction due to the 3-cycle delay assigned to the cycle-1 branch instruction. So, in this example, the four instructions issue over 2 clock cycles and complete execution in 6 clock cycles. Whereas, in the previous example, those same four instructions issue over 7 clock cycles and complete execution in 8 clock cycles. The total number of clock cycles for execution (which includes a clock cycle for a final commit stage) is smaller by 2 clock cycles due to the second load instruction issuing 2 cycles earlier than it would have with flexible execution mode disabled.

Another feature of the processor 102 that is configured to support flexible execution mode is the use of skip circuitry in the pipeline 104. The skip circuitry enables a result of an operation performed in a path that includes one or more silo stages to potentially skip any number of those silo stages to compensate for any delay assigned to an issued instruction. In the example illustrated in FIG. 2, the skip circuitry includes skip paths 222 for the first path 212A through the pipeline 104. A result at the output port of the functional unit 214 is connected by conductor paths to input ports of skip a multiplexer 224 in stage 208B, a skip multiplexer 226 in stage 208C, and a skip multiplexer (not shown) in the circuitry 217. By appropriately setting the selection control inputs of the skip multiplexers, the pipeline 104 is able to provide a result to the final commit stage 210 earlier by a number of cycles that corresponds to an assigned delay. For example, the first delay instruction issued in cycle 1 with a delay of 3 clock cycles will have its delay operation performed in cycle 4. In that same cycle, a skip multiplexer will provide the result to the final commit stage 210, skipping three pipeline stages—the same number of pipeline stages are skipped as the number of clock cycles by which the instruction was delayed. Similarly, the result of the second delayed instruction issued in cycle 2 with a delay of 3 clock cycles will have its result reach the commit stage 210 in cycle 5, also skipping 3 pipeline stages. In flexible execution mode, for a given instruction, the processor 102 is able to dynamically configure the skip circuitry to skip a number of silo stages that is equal to the assigned delay. An instruction in the first path 212A assigned a delay of 2 clock cycles would (after a delay of 2 clock cycles) have its result skip ahead in the pipeline by 2 stages. Instead of a result of the functional unit 214 having to go through the pipeline registers 211 before stages 208B and 208C, the result would skip ahead by 2 stages to the pipeline register 211 before stage 210 using the multiplexer 226. The goal of the skipping is for the number of silo stages left for a delayed dependent instruction to be the same as the number of silo stages that would have been left if there were no delay.

The complexity needed in the circuitry of the processor 102 to support this limited form of out-of-order execution is manageable because both the issuing and the committing remain in-order. To further reduce complexity, in some implementations, the issue circuitry 206 does not allow memory operations (e.g., load or store operations) to execute out-of-order with respect to other memory operations. Some implementations also place a limit on the maximum value of the execution delay (e.g., a limit of a delay of 3 clock cycles could be used in this example). This limit may prevent the need to lengthen the pipeline with extra silo stages, and can be determined to match the largest potential latency between a latent instruction and a dependent instruction (e.g., a load-to-use latency of 3 clock cycles).

Other embodiments are within the scope of the following claims.

What is claimed is:

1. A method for executing instructions in a processor, the method comprising:
   selecting or more instructions to be issued together in the same clock cycle of the processor from among a plurality of instructions, the selected one or more instructions occurring consecutively according to a program order; and
   executing instructions that have been issued, through multiple execution stages of a pipeline of the processor, the executing including:
   determining a delay assigned to a first instruction, and sending a result of a first operation performed by the first instruction in a first execution stage to a second execution stage, where the number of execution stages between the first execution stage and the second execution stage is based on the determined delay.

2. The method of claim 1, wherein the first stage includes a functional unit configured to perform the first operation, and the second execution stage does not include any functional unit configured to perform the first operation.

3. The method of claim 2, wherein the second stage occurs later in the pipeline than the first stage.

4. The method of claim 2, wherein sending the result of the first operation to the second stage includes sending an output of the functional unit to an input of a multiplexer in the second stage.

5. The method of claim 1, wherein there are multiple paths through the execution stages.

6. The method of claim 5, wherein the first instruction is executed along a first path, the result of the first operation depends on a result of a second operation performed by a second instruction, and the second instruction is executed along a second path different from the first path.

7. The method of claim 1, further comprising analyzing, in at least one stage of the pipeline, operations to be performed by instructions, the analyzing including:
   determining a latency associated with a first operation to be performed by a first instruction,
   determining a second operation to be performed by a second instruction, where a result of the second operation depends on a result of the first operation, and
   assigning a delay to the second instruction corresponding to the determined latency associated with the first operation.

8. The method of claim 1, wherein any instruction selected to be issued in a clock cycle after a clock cycle in which a previous instruction issued occurs later in the program order than the previous instruction.

9. The method of claim 1, wherein the number of execution stages between the first execution stage and the second execution stage is equal to the determined delay.

10. A processor comprising:
    circuitry configured to select or more instructions to be issued together in the same clock cycle of the processor from among a plurality of instructions, the selected one or more instructions occurring consecutively according to a program order; and circuitry configured to execute instructions that have been issued, through multiple execution stages of a pipeline of the processor, the executing including:
determining a delay assigned to a first instruction, and
sending a result of a first operation performed by the first instruction in a first execution stage to a second execution stage, where the number of execution stages between the first execution stage and the second execution stage is based on the determined delay.

11. The processor of claim 10, wherein the first stage includes a functional unit configured to perform the first operation, and the second execution stage does not include any functional unit configured to perform the first operation.

12. The processor of claim 11, wherein the second stage occurs later in the pipeline than the first stage.

13. The processor of claim 11, wherein sending the result of the first operation to the second stage includes sending an output of the functional unit to an input of a multiplexer in the second stage.

14. The processor of claim 10, wherein there are multiple paths through the execution stages.

15. The processor of claim 14, wherein the first instruction is executed along a first path, the result of the first operation depends on a result of a second operation performed by a second instruction, and the second instruction is executed along a second path different from the first path.

16. The processor of claim 10, further comprising circuitry in at least one stage of the pipeline, configured to analyze operations to be performed by instructions, the analyzing including:
determining a latency associated with a first operation to be performed by a first instruction,
determining a second operation to be performed by a second instruction, where a result of the second operation depends on a result of the first operation, and
assigning a delay to the second instruction corresponding to the determined latency associated with the first operation.

17. The processor of claim 10, wherein any instruction selected to be issued in a clock cycle after a clock cycle in which a previous instruction issued occurs later in the program order than the previous instruction.

18. The processor of claim 10, wherein the number of execution stages between the first execution stage and the second execution stage is equal to the determined delay.

* * * * *